(12) United States Patent
Tang et al.

(10) Patent No.: US 9,541,411 B2
(45) Date of Patent: Jan. 10, 2017

(54) NAVIGATION SYSTEM WITH DESTINATION TRAVEL CATEGORY EXTRACTION MEASUREMENT CAPTURE MECHANISM AND METHOD OF OPERATION THEREOF

(75) Inventors: Ky Tang, Milpitas, CA (US); Manohar Ellanti, Fremont, CA (US); HaiPing Jin, San Jose, CA (US); Hengbin Luo, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 590 days.

(21) Appl. No.: 12/951,015

(22) Filed: Nov. 20, 2010

(65) Prior Publication Data

US 2012/0130630 A1    May 24, 2012

(51) Int. Cl.
   *G01C 21/26*    (2006.01)
   *G01C 21/34*    (2006.01)
   *G01C 22/00*    (2006.01)
   *G06Q 10/04*    (2012.01)

(52) U.S. Cl.
   CPC ......... *G01C 21/3415* (2013.01); *G01C 21/343* (2013.01); *G01C 22/00* (2013.01); *G06Q 10/047* (2013.01)

(58) Field of Classification Search
   USPC ........................................................ 701/413
   See application file for complete search history.

(56) References Cited

U.S. PATENT DOCUMENTS

| | | | |
|---|---|---|---|
| 4,685,061 A | 8/1987 | Whitaker | |
| 4,755,832 A | 7/1988 | Gulas et al. | |
| 5,068,656 A | 11/1991 | Sutherland | |
| 5,220,507 A * | 6/1993 | Kirson | 701/533 |
| 5,267,159 A * | 11/1993 | O'Neall | 701/32.5 |
| 5,557,524 A * | 9/1996 | Maki | 701/32.4 |
| 5,790,974 A | 8/1998 | Tognazzini | |
| 5,808,565 A | 9/1998 | Matta et al. | |
| 5,842,009 A | 11/1998 | Borovoy et al. | |
| 5,892,463 A * | 4/1999 | Hikita et al. | 340/995.13 |
| 5,974,356 A * | 10/1999 | Doyle et al. | 701/420 |
| 6,301,533 B1 * | 10/2001 | Markow | 701/32.4 |
| 6,393,346 B1 | 5/2002 | Keith et al. | |
| 6,778,900 B2 * | 8/2004 | Tengler et al. | 701/527 |
| 6,961,420 B2 * | 11/2005 | DeSalvo | 379/355.02 |
| 7,321,823 B2 | 1/2008 | Brulle-Drews et al. | |
| 7,343,243 B2 | 3/2008 | Smith et al. | |
| 7,555,378 B2 | 6/2009 | Larschan et al. | |
| 7,908,191 B1 * | 3/2011 | Dinamani et al. | 705/31 |
| 2003/0046304 A1 | 3/2003 | Peskin et al. | |
| 2005/0004754 A1 * | 1/2005 | Hayes | 701/209 |

(Continued)

OTHER PUBLICATIONS

U.S. Appl. No. 12/609,300, filed Oct. 30, 2009, Tang et al.
International Search Report from PCT Application No. PCT/US2011/053104 dated Feb. 21, 2012.

*Primary Examiner* — Shelley Chen
(74) *Attorney, Agent, or Firm* — IP Investment Law Group

(57) ABSTRACT

A method of operation of a navigation system includes: generating a travel route having a first destination; assigning a first travel category for the first destination; detecting a detour to a second destination separate from the travel route; assigning a second travel category for the second destination; and capturing a mileage measurement for the travel route where the detour to the second destination is excluded based on the first travel category not being the same as the second travel category for displaying on a device.

20 Claims, 8 Drawing Sheets

(56) References Cited

U.S. PATENT DOCUMENTS

| | | |
|---|---|---|
| 2005/0180661 A1 | 8/2005 | El Bernoussi et al. |
| 2007/0150137 A1* | 6/2007 | Graham ........................... 701/35 |
| 2007/0150139 A1* | 6/2007 | Hardy ............................. 701/35 |
| 2007/0159361 A1* | 7/2007 | Hirayama .................. 340/995.1 |
| 2007/0208503 A1* | 9/2007 | Harnsberger ................. 701/208 |
| 2007/0255586 A1 | 11/2007 | Green et al. |
| 2008/0052105 A1* | 2/2008 | Jin et al. ........................... 705/1 |
| 2008/0103657 A1 | 5/2008 | Norton et al. |
| 2008/0125967 A1 | 5/2008 | Sprigg |
| 2008/0233932 A1* | 9/2008 | Sapp ........................... 455/415 |
| 2008/0243374 A1 | 10/2008 | Hatazawa |
| 2010/0063904 A1* | 3/2010 | Ronen et al. ................... 705/30 |
| 2011/0184600 A1* | 7/2011 | Kristinsson et al. ........... 701/22 |

\* cited by examiner

NAVIGATION SYSTEM WITH DESTINATION TRAVEL CATEGORY EXTRACTION MEASUREMENT CAPTURE MECHANISM AND METHOD OF OPERATION THEREOF

TECHNICAL FIELD

The present invention relates generally to a navigation system and more particularly to a system with a navigation system with destination travel category extraction measurement capture mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone or a personal digital assistant (PDA).

Location based services allow users to create, transfer, store, and/or consume information that affects the "real world". One such use of location-based services is to provide increased safety features for vehicles.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information, when available or in service areas.

In response to consumer demand, navigation systems are providing ever-increasing functionality. Current navigations systems lack features that accurately track and correct driving statistics. The lack of these features entail safety risks as drivers many be distracted by tracking their own statistics manually. Advanced tools that can monitor and track driver statistics can decrease accidents and reduce costs.

Thus, a need still remains for a navigation system with destination travel category extraction measurement capture mechanism providing low cost, improved functionality, and improved reliability. In view of the ever-increasing need to save costs and improve efficiencies, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a travel route having a first destination; assigning a first travel category for the first destination; detecting a detour to a second destination separate from the travel route; assigning a second travel category for the second destination; and capturing a mileage measurement for the travel route where the detour to the second destination is excluded based on the first travel category not being the same as the second travel category for displaying on a device.

The present invention provides a navigation system, including: a create route module for generating a travel route having a first destination; a first category module, coupled to the create route module, for assigning a first travel category for the first destination; a detect detour module, coupled to the first category module, for detecting a detour to a second destination separate from the travel route; a second category module, coupled to the detect detour module, for assigning a second travel category for the second destination; and a capture module, coupled to the second category module, for capturing a mileage measurement for the travel route where the detour to the second destination is excluded based on the first travel category not being the same as the second travel category for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
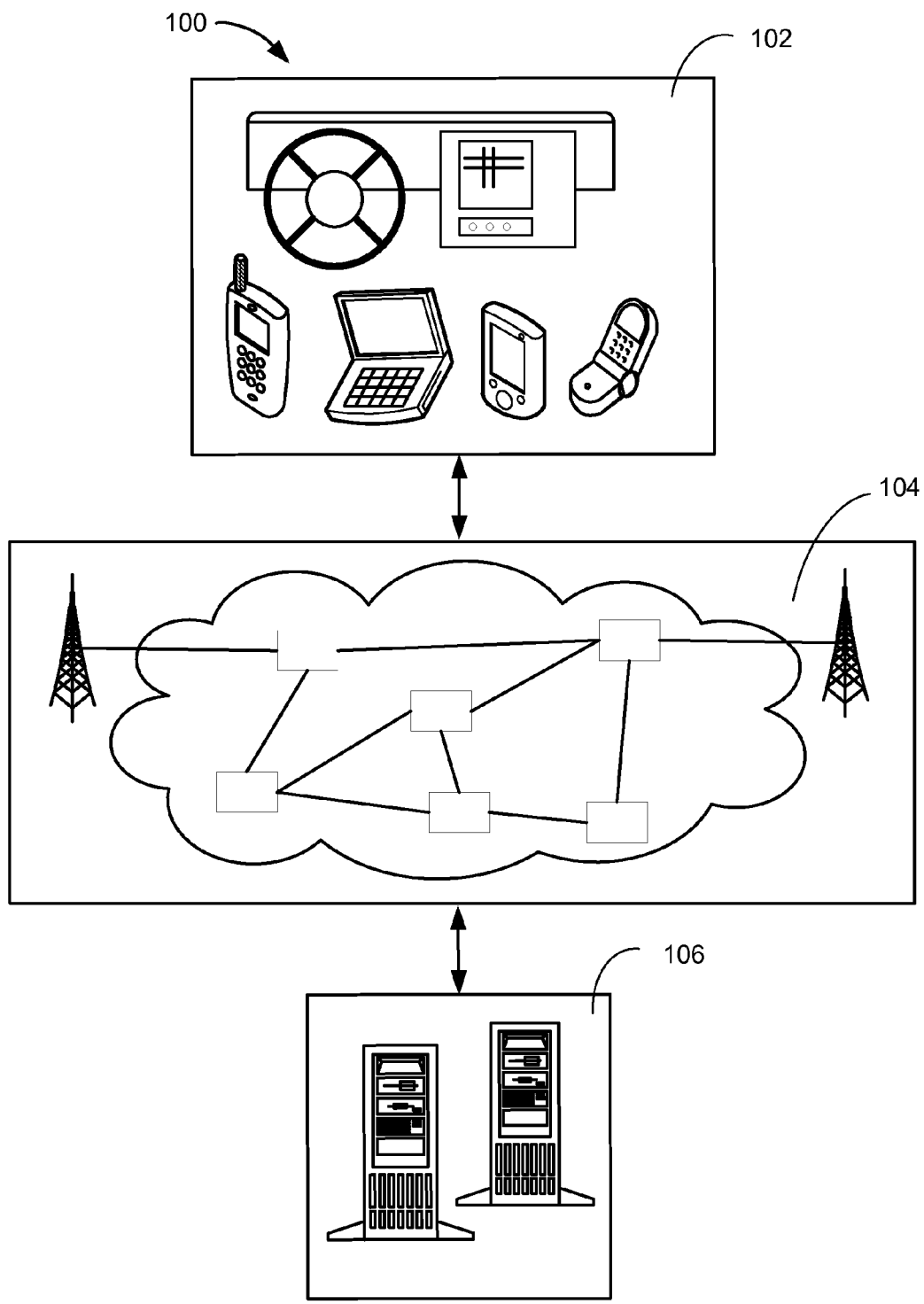
FIG. 1 is a navigation system with destination travel category extraction measurement capture mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "travel category" referred to herein can include a category for organizing travel and business statistics. The travel category can be a label of the purpose of the trip. For example, "Personal" can be a travel category and "Work" can be a travel category. The travel category can be labeled to specific clients for work. For example, the travel category can organize all mileage spent traveling to client A.

Referring now to FIG. 1, therein is shown a navigation system 100 with destination travel category extraction measurement capture mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telemetric navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
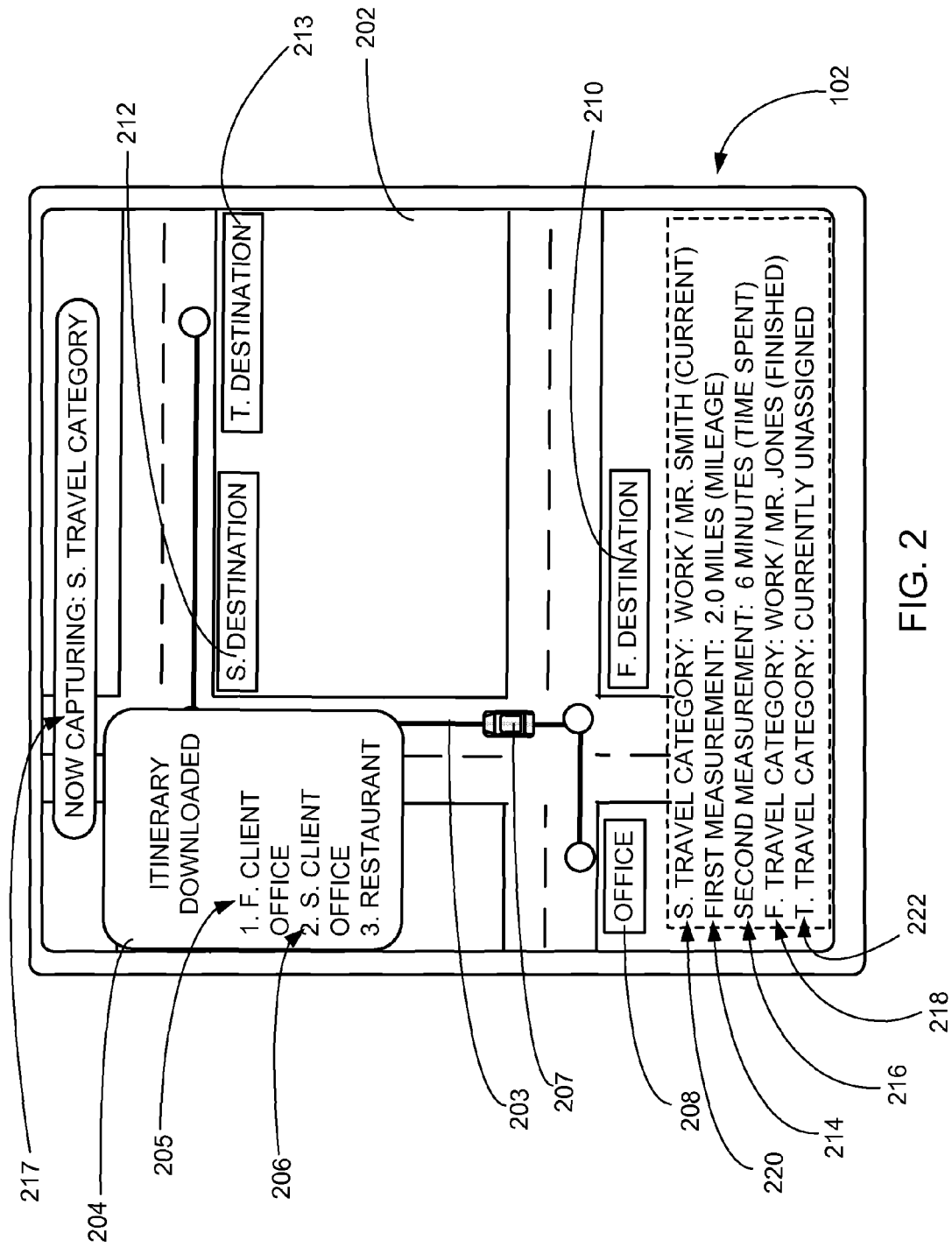
FIG. 2 is a first example of a display interface of the first device.

Referring now to FIG. 2, therein is shown a first example of a display interface 202 of the first device 102. The display interface 202 can depict a travel route 203, and an itinerary 204. The travel route 203 is defined as a set of destinations to be traveled to during a trip.

The display interface 202 can depict the travel route 203 in a map view. For example, the travel route 203 depicts a route on a map that includes an office 208, a first destination 210, a second destination 212, and a third destination 213. The travel route 203 can be generated by the navigation system 100 of FIG. 1 for display on the display interface 202. The travel route 203 can be used for navigating to destinations.

The itinerary 204 is defined as a schedule or list of destinations or appointments that can be generated by the navigation system 100. The navigation system 100 can generate the travel route 203 using the list of destinations from the itinerary 204. The itinerary 204 can also be manually inputted into the navigation system 100 or the itinerary 204 can be received from electronic media or another device. The itinerary 204 can be transmitted to the navigation system 100 through wireless connection, USB cable, electronic media, or combination thereof.

For example, the itinerary 204 can be created on a personal computer and uploaded to a server such as the second device 106 of FIG. 1. The second device 106 can transmit the itinerary 204 to the first device 102 of FIG. 1 through a wireless connection. Further for example, the itinerary 204 can be created on a smartphone and transmitted to the first device 102 by using a USB cable.

The itinerary 204 can also include a variety of formats such as a calendar, a day-planer, an agenda, a list, a docket or a combination thereof. The itinerary 204 can also include a list of appointments with location names or location names. The navigation system 100 can extract the names from the list and can assign destinations that are associated with the names for generating the travel route 203.

A first location name 205 is defined as defined as a name from the itinerary 204 or a name associated with a destination. For example, the first location name 205 for the address of "123 Main Street" can be "Mr. Jones' Office". The first location name 205 for "1600 Pennsylvania Ave" can be "the White House" as a name for the building or location.

A second location name 206 can be defined as a second name from the itinerary 204 or a name associated with a destination. Each destination can have a location name associated with the destination. For example, the third destination 213 can be associated with a third location name and so forth.

Destinations can also be associated with the same location name. For example, the first destination 210 and the third destination 213 can both be factories that are owned by "Mr. Jones". The first destination 210 and the third destination 213 can be associated with the first location name 205 based on the example above.

A current location 207 is defined as the current geographical position of the first device 102 on the travel route 203. The current location 207 can be the current geographical position of a vehicle or pedestrian that has the first device 102. As an example, the display interface 202 can depict the current location 207 as a vehicle at a corresponding point on the travel route 203.

The office 208 can depict the location of an office building on the travel route 203. For illustrative purposes, the office 208 can represent the starting point of the travel route 203. The first destination 210, the second destination 212, and the third destination 213 can depict the locations of client offices, stores, buildings, markets, and restaurants.

A mileage measurement 214 is defined as a recording of distance units. For example, the mileage measurement 214 can be a recording of mileage traveled. The mileage measurement 214 can be customized to record different distance units such as miles or kilometers.

For brevity of description of the present invention, the mileage measurement 214 will be described as a record of vehicle mileage although the mileage measurement 214 can be configured to record other travel statistics. For example, the mileage measurement 214 can be customized to be a record of footsteps.

A temporal measurement 216 is defined as a recording of time. For illustrative purposes, the display interface 202 depicts the temporal measurement 216 as a recording of time spent traveling to destinations in minutes. For brevity of description of the present invention, the temporal measurement 216 will be described as a record of time although the temporal measurement 216 can be customized to record other statistics. For example, the temporal measurement 216 can be customized to be a record of idle time for the vehicle when the engine is on but the vehicle is not moving.

A capture 217 is defined as when the navigation system 100 records travel or business statistics. The capture 217 can be when the navigation system 100 is recording or tracking the mileage measurement 214 and the temporal measurement 216.

A first travel category 218 is defined as a category for keeping track of travel statistics that are associated with a specific purpose, client, or combination thereof. For example, the first travel category 218 can be assigned as a category for all mileage traveled, all mileage traveled during a day, all business mileage traveled, or all personal mileage traveled. The first travel category 218 can be used to categorize the mileage measurement 214 and the temporal measurement 216 under the general travel categories list above. The first travel category 218 can be assigned by extracting information associated with a destination being traveled to. This will be explained in greater detail below.

The first travel category 218 can also be assigned as a category for specific business clients and purposes. For example, the first travel category 218 can be customized to a specific business client for tracking all mileage that was spent traveling to the business client's office. When displayed on the display interface 202, the first travel category 218 can include the following categories: "Personal, Personal/Grocery, Personal/Vacation, Personal/Shopping, Personal/Dinning, Joyride, Business, Work, Client A, Client B, Client: Mr. Smith, Job, Appointment 1, Appointment 2," all as examples.

A second travel category 220 is defined as a second category for keeping track of travel statistics that are associated with a specific purpose, client, or combination thereof. The second travel category 220 can be customized to track travel statistics in a similar way as the first travel category 218. A third travel category 222 is defined as a third category for keeping track of travel statistics that are associated with a specific purpose, client, or combination thereof. The third travel category 222 can be customized to track travel statistics in a similar way as the first travel category 218.

For example, the first travel category 218 can be a category to organize travel and business statistics for "Mr. Jones". The second travel category 220 can be a category to organize travel and business statistics for "Mr. Smith". For illustrative purposes, the display interface 202 can show an example of a trip to Mr. Jones' office at the first destination 210, Mr. Smith's office at the second destination 212, and a restaurant at the third destination 213. The navigation system 100 can extract possible travel categories for the destination that is labeled "Mr. Jones" and then assign an appropriate travel category to the destination. This will be explained in greater detail below.

The navigation system 100 can extract and assign the first travel category 218 to the first destination as "Mr. Jones/Work". The navigation system 100 can track the mileage and time spent traveling to the first destination 210 under the first travel category 218. The mileage spent traveling to the second destination 212 can be recorded under the second travel category 220.

If the trip to the restaurant at the third destination 213 is a business dinner with Mr. Jones, then the mileage recorded to the third destination 213 can be recorded under the first travel category 218. For example, the navigation system 100 can extract "Mr. Jones" from information from the itinerary 204 that was associated with the dinner appointment at the third destination 213. The navigation system 100 can assign the first travel category 218 to the third destination 213 because the navigation system 100 also extracted "Mr. Jones" as the first travel category 218 for the first destination 210 on the travel route 203.

If the dinner at the third destination 213 is not associated with the first travel category 218, the second travel category 220, work or business, then the navigation system 100 can assign "personal" for the third travel category 222. The mileage and time recorded from the second destination 212 to the third destination 213 can be recorded under the third travel category 222.

Figure 3:
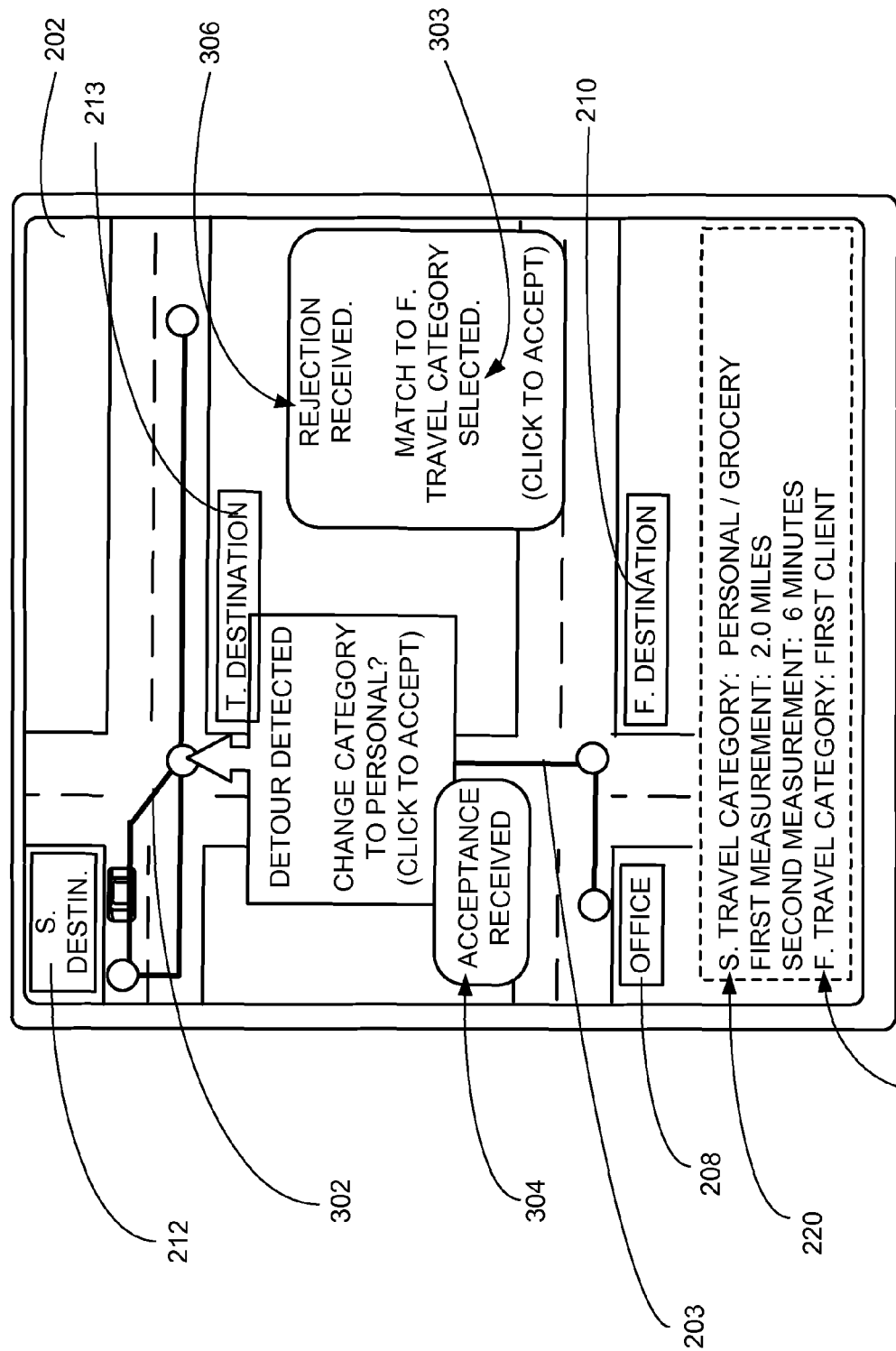
FIG. 3 is a second example of the display interface.

Referring now to FIG. 3, therein is shown a second example of the display interface 202. The display interface 202 can depict a vehicle that is traveling along the travel route 203 but takes a detour 302. The detour 302 is defined as a change to the travel route 203 or an addition of a new destination that was not on the travel route 203. The destination that represents the detour 302 is not on the travel route 203 when the travel route 203 is first generated.

On the display interface 202, the location of the detour 302 can become the new destination for the second destination 212 because the vehicle has already passed the first destination 210. The second destination 212 of FIG. 2 can become the third destination 213 of FIG. 3. The navigation system 100 can store a copy of the travel route 203 that was first generated and also store a copy of the new route that was created by the addition of the detour 302. The copies can be stored for business and travel record keeping purposes.

A selection 303 is defined as an assignment made by the navigation system 100 of an appropriate travel category or function of the navigation system 100. For example, the selection 303 can be the assignment of the first travel category 218 of FIG. 2 or the second travel category 220 of FIG. 2 that was extracted from information associated with the destination. The navigation system 100 can assign the first travel category 218 as the selection 303 for the first destination 210 of FIG. 2. The navigation system 100 can receive user input that the selection 303 is correct or incorrect for the first destination 210. If incorrect, the navigation system 100 can assign a new travel category for the first destination 210 such as the second travel category 220.

An acceptance 304 is defined as an affirmative response or confirmation of an assignment made by the navigation system 100. For example, the acceptance 304 can be used to accept or confirm the selection 303. If the selection 303 is correct, a user can send the acceptance 304 to the navigation system 100.

The acceptance 304 can be received by a variety of responses including: voice command, an input such as a single selection or click of a button, a hand gesture, a facial gesture, or a combination thereof. For example, the navigation system 100 can ask for a confirmation of the selection 303. The driver of a vehicle can say "yes" to send the acceptance 304 to the navigation system 100. The driver of the vehicle can also press a button to send the acceptance 304 to the navigation system 100. The navigation system 100 can be configured to receive no response from the user and after a pre-determine set of time, interpret the no response as the acceptance 304.

A rejection 306 is defined as a negative response of an assignment made by the navigation system 100. The rejection 306 can be used to reject the selection 303 of the first travel category 218 or the second travel category 220. For example, the navigation system 100 can extract and assign the first travel category 218 as the selection 303 for the third destination 213 of FIG. 2. If the selection 303 is incorrect, a user can send the rejection 306 to the navigation system 100. If the navigation system 100 receives the rejection 306, the navigation system 100 can assign a new travel category for the third destination 213.

The rejection 306 can also be received by a variety of responses including: voice command, an input such as a single selection or click of a button, a hand gesture, a facial gesture, or a combination thereof. For example, the driver can say "no" or press a button twice on the first device 102 of FIG. 1.

For illustrative purposes, the detour 302 to the travel route 203 can be to a market. The navigation system 100 can detect the detour 302 and assign a new travel category for the new destination. The navigation system 100 can identify that the second destination 212 on the travel route 203 is now a market and not an office building.

The navigation system 100 can make the selection 303 of a personal travel category and the navigation system 100 can prompt the driver for confirmation. The driver can send the acceptance 304 to the navigation system 100 to begin tracking mileage under a personal travel category instead the business travel category that was assigned to the old destination.

Figure 4:
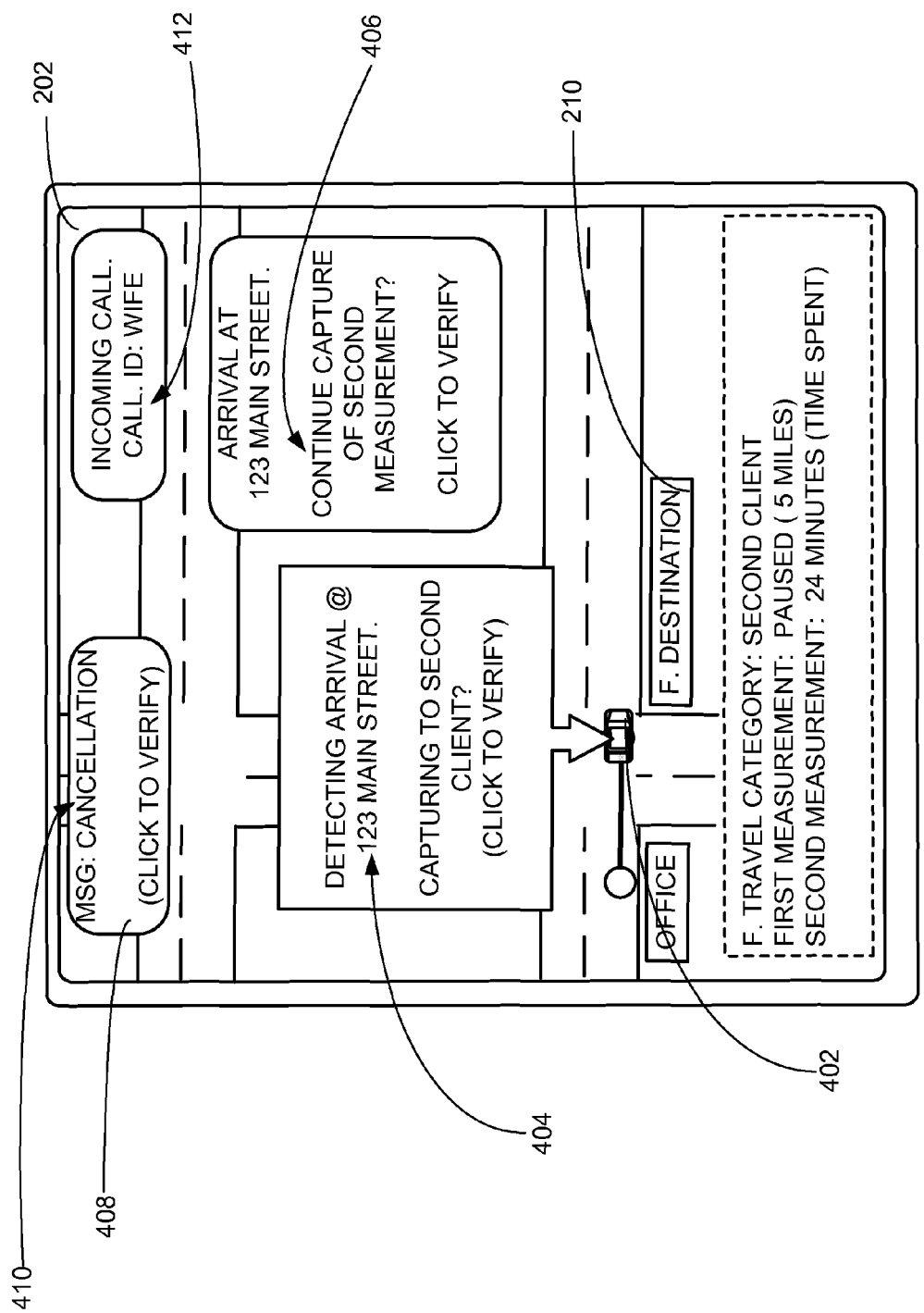
FIG. 4 is a third example of the display interface.

Referring now to FIG. 4, therein is shown a third example of the display interface 202. The display interface 202 can depict a vehicle that is parked at the first destination 210. An arrival 402 is defined as when the navigation system 100 detects that the vehicle has parked at a destination.

For example, the navigation system 100 can detect when the vehicle has parked at the first destination 210. When the arrival 402 is detected, the navigation system 100 can terminate the capture 217 of FIG. 2 of the mileage measurement 214 of FIG. 2 for the travel category that is associated with the first destination 210. When the vehicle begins to travel to the second destination 212, the navigation system 100 can extract and assign an appropriate travel category to the second destination 212 and resume the capture 217 of the mileage measurement 214.

A street address 404 is defined as number and street name associated with the location of a destination. For illustrative purposes, the first destination 210 of FIG. 4 can have the street address 404 of "123 Main Street". The navigation system 100 can use the street address 404 to identify the first location name 205 of FIG. 2 that is associated with the street address 404.

For example, the navigation system 100 can access a database or perform an internet search to identify a first location name 205 of FIG. 2 that is associated with the street address 404. The street address 404 of "1600 Pennsylvania Ave." can be also be inputted into the navigation system 100. The navigation system 100 can extract "the White House" as a location name of the first destination 210. The street address 404 and location names associated with the street address 404 can be inputted into and stored on the navigation system 100 for future use.

Further for example, the navigation system 100 can use the first location name 205 of "the White House" to extract the travel category for the first destination 210. For illustrative purposes, the first travel category 218 of FIG. 2 can be "Work/Governmental" if the driver was traveling to the first destination 210 for business related purposes. If the trip to "the White House" was for recreational purposes, the navigation system 100 can extract a personal category for the first travel category 218.

The navigation system 100 can also use geocoding and reverse geocoding to extract and assign the appropriate travel category for recording travel and business statistics. Geocoding is the process of identifying associated geographic coordinates from other geographic data such as street addresses. Reverse geocoding is the process of using latitude and longitude to find a readable address or place name. The navigation system 100 can use geocoding and reverse geocoding to extract and assign the first travel category 218 and the second travel category 220 without the need of the itinerary 204 of FIG. 2 or a pre-generated route.

For example, by identifying the street address 404 and the first location name 205, the navigation system 100 can extract and assign the travel category from information associated with the street address 404 and the first location name 205. The navigation system 100 does not require the itinerary 204 of FIG. 2 or a pre-generated route to extract and assign the travel category. A driver can drive to different destinations without a planned trip and the navigation system 100 can identify the destinations that were stopped at.

If the navigation system 100 detects a stop at a destination, the navigation system 100 can use geocoding and reverse geocoding to extract and assign the travel category for the destination. The navigation system 100 can track travel and business statistic and extract and assign the travel category without user generated content having to be inputted into the navigation system 100. This will be explained in greater detail below.

A continuation query 406 is defined as a query from the navigation system 100 to continue or terminate the tracking of time. For example, if the navigation system 100 detects the arrival 402, the navigation system 100 can display to the driver the continuation query 406.

For example, if the navigation system 100 receives the acceptance 304 of FIG. 3 to the continuation query 406, the navigation system 100 will not terminate the capture 217 of FIG. 2 of the temporal measurement 216 of FIG. 2. The capture 217 of the mileage measurement 214 can automatically be terminated because the vehicle has parked at the destination and mileage no longer needs to be tracked.

The navigation system 100 can allow the tracking of time or billable hours while the user is at the destination. For example, the navigation system 100 can track the temporal measurement 216 while traveling to the first destination 210. After detecting the arrival 402, the navigation system 100 can display the continuation query 406. The user can terminate the capture 217 of the temporal measurement 216 after seeing the continuation query 406 or at any time to track hours at the location.

A message 408 is defined as a transmission or communication that can be received or sent by the navigation system 100. The message 408 can provide information that can modify the itinerary 204 of FIG. 2 such as additional destinations or cancelled appointments. The message 408 can be from an employer, client, or family member. The message 408 can include an email, a text message, a voice message, or a telephone call.

The message 408 can include a cancellation 410 and a caller identification 412. The cancellation 410 is defined as information within the message 408 that indicates that a scheduled appointment has been cancelled that was on the itinerary 204 or on the travel route 203. For example, the navigation system 100 can begin recording the mileage to the first destination 210 and receive the cancellation 410 while on route to the first destination 210. The navigation system 100 can receive the cancellation 410 and terminate the capture 217 of the mileage measurement 214 and the temporal measurement 216.

The caller identification 412 is defined as information that identifies the sender of the message 408. For example, the caller identification 412 can include information such as the first location name 205 of FIG. 2 and the street address 404 that can be associated with the first location name 205. The caller identification 412 can be attached to different forms of communication such as voice calls, voice messages, emails, and text messages.

The caller identification 412 can be used for assigning the selection 303 of FIG. 3 of the first travel category 218 and the second travel category 220. For example, the navigation system 100 can detect an incoming text message from the user's employer. The text message can contain information that modifies the itinerary 204 with a new destination. The navigation system 100 can recognize that the new destination is the detour 302 of FIG. 3 and begin providing navigation instructions to the new destination. The navigation system 100 can detect that the text message was from the employer and assign an appropriate work-related travel category.

In another example, the navigation system 100 can detect an incoming telephone call from the user's spouse. In the telephone call, the driver could have received instructions to run an errand to the market before arriving at the next destination on the itinerary 204.

For illustrative purposes, the detour 302 to the second destination 212 of FIG. 3 can be to a market. The navigation system 100 can recognize the caller identification 412 as from the driver's spouse and that the new destination is to the market. Using the caller identification 412 and the destination, the navigation system 100 can extract and assign a "personal/grocery" travel category for the new destination. This travel category can allow the user to track personal grocery expenditures.

Figure 5:
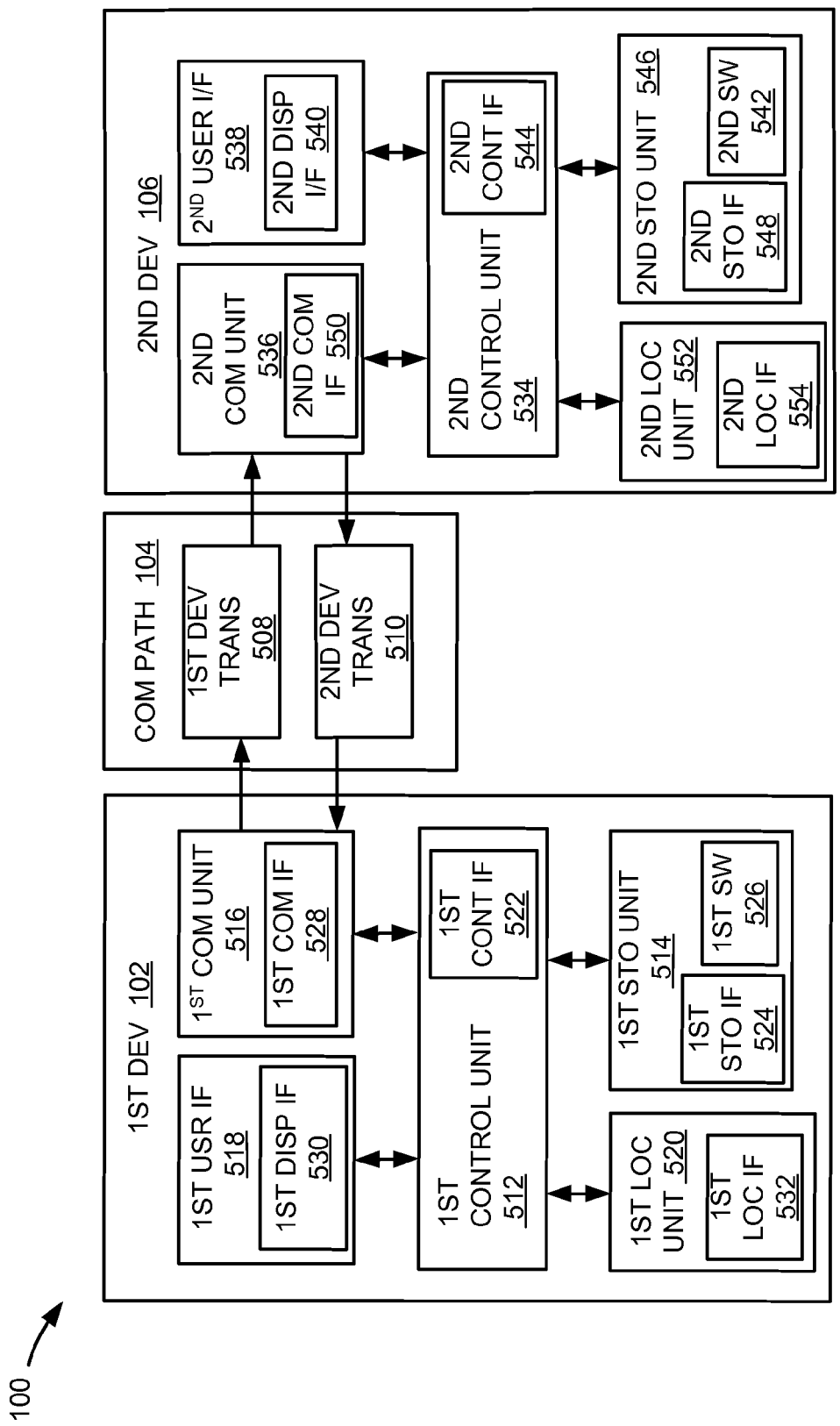
FIG. 5 is an exemplary block diagram of the navigation system.

Referring now to FIG. 5, therein is shown an exemplary block diagram of the navigation system 100. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a first location unit 520. The first device 102 of FIG. 5 can be similarly described by the first device 102 of FIG. 1.

The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first location unit 520 can generate location information, current heading, and current speed of the first device 102, as examples. The first location unit 520 can be implemented in many ways. For example, the first location unit 520 can function as at least a part of a global positioning system (GPS), an inertial navigation system, a cellular-tower location system, a pressure location system, or any combination thereof.

The first location unit 520 can include a first location interface 532. The first location interface 532 can be used for communication between the first location unit 520 and other functional units in the first device 102. The first location interface 532 can also be used for communication that is external to the first device 102.

The first location interface 532 can receive information from the other functional units or from external sources, or can transmit information to the other functional units or to external destinations. The external sources and the external destinations refer to sources and destinations external to the first device 102.

The first location interface 532 can include different implementations depending on which functional units or external units are being interfaced with the first location unit 520. The first location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the first location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. Examples of the first display interface 530 can include the display interface 202 of FIG. 2. The first display interface 530 can include a display, a projector, a video screen, a speaker, or any combination thereof. The screenshot shown on the display interface 202 described in FIG. 2 can represent an example of a screenshot for the navigation system 100.

The first control unit 512 can operate the first user interface 518 to display information generated by the navigation system 100. The first control unit 512 can also execute the first software 526 for the other functions of the navigation system 100, including receiving location information from the first location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, a second user interface 538, and a second location unit 552.

The second user interface 538 allows a user (not shown) to interface and interact with the second device 106. The second user interface 538 can include an input device and an output device. Examples of the input device of the second user interface 538 can include a keypad, a touchpad, softkeys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the first location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

The second location unit 552 can receive location information, current heading, and current speed of the first device 102, as examples. The second location unit 552 can be implemented in many ways. For example, the second location unit 552 can function as at least a part of a global positioning system (GPS), an inertial navigation system, a cellular-tower location system, a pressure location system, or any combination thereof.

The second location unit 552 can include a second location interface 554. The second location interface 554 can be used for communication between the second location unit 552 and other functional units in the first device 102. The second location interface 554 can also be used for communication that is external to the second device 106.

The second location interface 554 can receive information from the other functional units or from external sources, or can transmit information to the other functional units or to external destinations. The external sources and the external destinations refer to sources and destinations external to the second device 106.

The second location interface 554 can include different implementations depending on which functional units or external units are being interfaced with the second location unit 552. The second location interface 554 can be implemented with technologies and techniques similar to the implementation of the second controller interface 544.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the first location unit 520, although it is understood that the second device 106 can also operate the first location unit 520.

Figure 6:
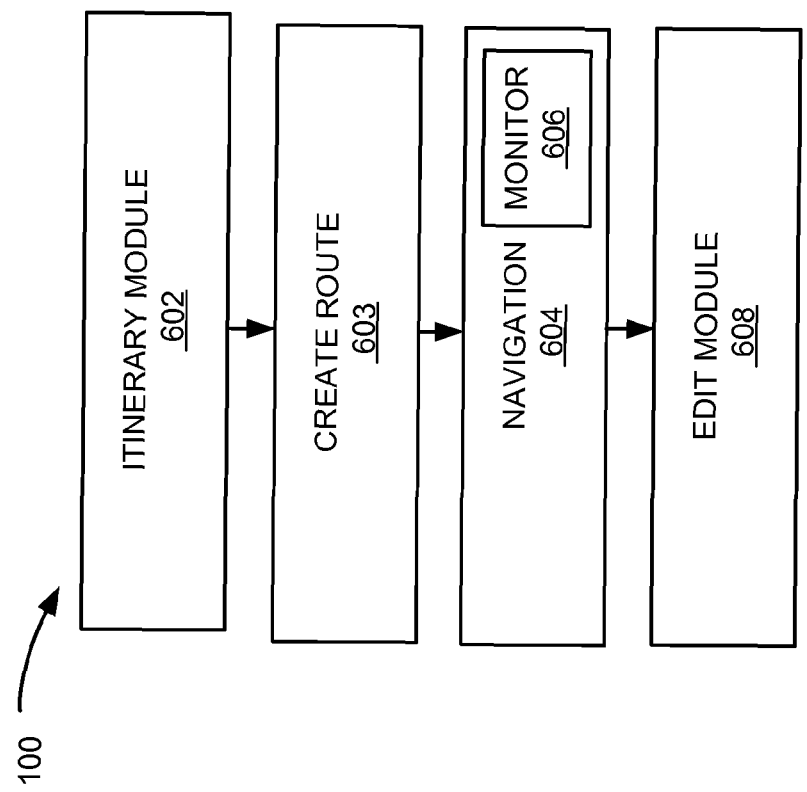
FIG. 6 is a control flow of the navigation system.

Referring now to FIG. 6, therein is shown a control flow of the navigation system 100. The navigation system 100 can include an itinerary module 602, a create route module 603, a navigation module 604, and an edit module 608. In the navigation system 100, as an example, each module is indicated by a number and successively higher module numbers follow one another. Control flow can pass from one module to the next higher numbered module unless explicitly otherwise indicated.

The itinerary module 602 requests and receives calendar and schedule information for generating routes. For example, the itinerary module 602 can request and receive the itinerary 204 of FIG. 2 for receiving calendar and schedule information. The itinerary 204 can include a list of the first location name 205 of FIG. 5 and the street address 404 of FIG. 4 for creating the travel route 203 of FIG. 2.

The itinerary module 602 can receive the itinerary 204 through electronic media, through wireless transmission, through manual input, or a combination thereof. For example, the itinerary module 602 can request and receive the itinerary 204 from a smart phone, electronic calendar, remote server, electronic media or combination thereof. Further for example, the itinerary module 602 can receive the itinerary 204 from the second device 106 of FIG. 1 through the communication path 104 of FIG. 1. The itinerary module 602 can send the itinerary 204 to the create route module 603.

The create route module 603 identifies destinations within the itinerary 204 and generates routes based on the destinations within the itinerary 204. For example, the create route module 603 can identify the street address 404 of FIG. 4 for the first destination 210 of FIG. 2, the second destination 212 of FIG. 2, and the third destination 213 of FIG. 4 from the itinerary 204. Once identified, the create route module 603 can generate the travel route 203 based on a schedule or order of the destinations on the itinerary 204. The itinerary 204 can be in a day plan or appointment calendar format where the destinations listed on the itinerary 204 must be traveled to in a specific order.

The navigation module 604 provides instructions for navigating the travel route 203. The navigation module 604 can display routes and can provide instructions for navigating to destinations. For example, the navigation module 604 can provide routing instructions to the first destination 210, the second destination 212, and the third destination 213.

The navigation module 604 can include a monitor module 606. The monitor module 606 captures mileage and time for each destination. The monitor module 606 also extracts and assigns the travel category to each destination to organize the mileage and time captures. The monitor module 606 can also detect the detour 302 of FIG. 3. The monitor module 606 will be explained in greater detail below.

The navigation module 604 can also generate routing instructions to the detour 302. The navigation module 604 can also generate a modified version of the travel route 203 that includes the detour 302. Both versions of the travel route 203 can be viewed for travel and business record keeping purposes.

The edit module 608 allows the viewing and modification to the record of the travel route 203. The edit module 608 also allows the modification of the mileage measurement 214 and the temporal measurement 216 after the capture 217 has concluded. For example, the edit module 608 can allow a user to modify the recorded mileage and the recorded time after the conclusion of the travel route 203. The edit module 608 can allow a user to adjust mileage and time records for different purposes and clients and correct the selection 303 of FIG. 3 for each destination.

The physical transformation from tracking the mileage measurement 214 and the temporal measurement 216 results in movement in the physical world, such as people using the first device 102 of FIG. 5, the vehicle, or a combination thereof, based on the operation of the navigation system 100. As the movement in the physical world occurs, the movement itself creates additional information that is converted back to the continued operation of the navigation system 100 and to continue the movement in the physical world.

The navigation system 100 can be implemented on the first device 102 of FIG. 5, on the second device 106 of FIG. 5, or partitioned between the first device 102 and the second device 106. The first software 526 of FIG. 5 of the first device 102 can include the navigation system 100. For example, the first software 526 can include the itinerary module 602, the create route module 603, the navigation module 604, the monitor module 606, and the edit module 608. The first control unit 512 of FIG. 5 can execute the first software 526.

The first control unit 512 can execute the itinerary module 602, the create route module 603, the navigation module 604, the monitor module 606, and the edit module 608. The first control unit 512 can execute the itinerary module 602 to receive the itinerary 204. The first control unit 512 can execute the create route module 603 to generate the travel route 203 of FIG. 2 using the itinerary 204.

The first control unit 512 can execute the navigation module 604 to generate instructions for navigation using the travel route 203. The first control unit 512 can execute the monitor module 606. This will be explained in further detail below. The first control unit 512 can execute the edit module to modify the mileage measurement 214.

The first user interface 518 of FIG. 5 can be coupled to the itinerary module 602, the navigation module 604, and the edit module 608. The itinerary 204 can be entered or selected into the first user interface 518. The first user interface 518 can be used to receive input for the edit module 608.

The first communication unit 516 of FIG. 5 can be coupled to the itinerary module 602 and the navigation module 604. The itinerary module 602 can receive the itinerary 204 by using the first communication unit 516. The navigation module 604 can use the first communication unit 516 to send and receive navigation information.

The first location unit 520 can be coupled to the create route module 603, the navigation module 604, and the monitor module 606. The create route module 603, the navigation module 604, and the monitor module 606 can use the first location unit 520 to determine the GPS position of the first device 102 of FIG. 1.

The first display interface 530 can be coupled to the itinerary module 602, the create route module 603, the navigation module 604, the monitor module 606. The first display interface 530 can display information including the itinerary 204, and the travel route 203.

In an example for the second device 106 of FIG. 5, the second software 542 of FIG. 5 can include the navigation system 100. For example, the second software 542 can include the itinerary module 602, the create route module 603, the navigation module 604, the monitor module 606, and the edit module 608. The second control unit 534 of FIG. 5 can execute the second software 542.

The second control unit 534 can execute the itinerary module 602, the create route module 603, the navigation module 604, the monitor module 606, and the edit module 608. The second control unit 534 can execute the itinerary module 602 to receive the itinerary 204. The second control unit 534 can execute the create route module 603 to generate the travel route 203 by using the itinerary 204.

The second control unit 534 can execute the navigation module 604 to generate instructions for navigation using the travel route 203. The second control unit 534 can execute the monitor module 606. This will be explained in further detail below. The second control unit 534 can execute the edit module to modify the mileage measurement 214.

The second user interface 538 of FIG. 5 can be coupled to the itinerary module 602, the navigation module 604, and the edit module 608. The itinerary 204 can be entered or selected into the second user interface 538. The second user interface 538 can be used to receive inputs for the edit module 608.

The second location unit 552 of FIG. 5 can be coupled to the create route module 603, the navigation module 604, and the monitor module 606. The create route module 603, the navigation module 604, and the monitor module 606 can use the second location unit 552 to determine the GPS position of the first device 102 of FIG. 1.

The second display interface 540 can be coupled to the itinerary module 602, the create route module 603, the navigation module 604, the monitor module 606. The second display interface 540 can display information including the itinerary 204, and the travel route 203.

In another example, the navigation system 100 can be partitioned between the first software 526 and the second software 542. For example, the first software 526 can include the navigation module 604 and the monitor module 606. The second software 542 can include the itinerary module 602, the create route module 603, and the edit module 608. The second control unit 534 can execute modules partitioned on the second software 542 and the first control unit 512 can execute modules partitioned on the first software 526.

For example, the second control unit 534 can execute the second software 542 to execute the itinerary module 602, the create route module 603, and the edit module 608. The second control unit 534 can execute the itinerary module 602 to receive the itinerary 204. The second control unit 534 can execute the create route module 603 to generate the travel route 203 by using the itinerary 204. The second control unit 534 can execute the edit module 608 to edit the mileage measurement 214.

The second user interface 538 can be used to enter information into the itinerary module 602 and the edit module 608. The itinerary 204 can be entered or selected into the second user interface 538. The second user interface 538 can be used to receive inputs for the edit module 608.

The second location unit 552 can be used by the create route module 603 to create routes. The create route module 603 can use the second location unit 552 to determine the GPS position of the first device 102 of FIG. 1. The second display interface 540 can be coupled to the itinerary module 602, the create route module 603, and the edit module 608. The second display interface 540 can display information including the itinerary 204, and the travel route 203.

The first control unit 512 can execute the navigation module 604 and the monitor module 606. The first control unit 512 can execute the navigation module 604 to generate instructions for navigation using the travel route 203. The first control unit 512 can execute the monitor module 606. This will be explained in further detail below.

The first user interface 518 can be used to enter information into the navigation module 604. The first communication unit 516 of FIG. 5 can be coupled to the navigation module 604. The navigation module 604 can use the first communication unit 516 and the first user interface 518 to send and receive navigation information.

The first location unit 520 can be used by the navigation module 604, and the monitor module 606 for navigation. The navigation module 604 and the monitor module 606 can use the first location unit 520 to determine the GPS position of the first device 102 of FIG. 1. The first display interface 530 can be used by the navigation module 604 and the monitor module 606 to display information such as the travel route 203.

It has been discovered that the present invention provides a navigation system 100 with destination travel category extraction measurement capture mechanism for tracking travel and business statistics. For example, the navigation system 100 can determine the purpose of a trip to the first destination 210 by assigning the first travel category 218 from extracted information associated with the first destination 210. The navigation system 100 can assign the second travel category 220 to the second destination 212 that has a different purpose or is unrelated to the first destination 210.

The navigation system 100 can also assign the first travel category 218 to the first destination 210 and the second destination 212 if the navigation system 100 detects that the trip to the first destination 210 and the second destination 212 are for the same purpose. The navigation system 100 can use the first travel category 218 and the second travel category 220 to organize the tracking of mileage and time under a travel category.

The navigation system 100 can assign the first travel category 218 by identifying the first location name 205 and the street address 404. For example, if the navigation system 100 detects that the first destination 210 is a market, the navigation system 100 can extract and assign a personal travel category for the first destination 210 as oppose to a travel category for a business appointment. These features allow the user to save time by minimizing the information that needs to be inputted into the navigation system 100 to track travel and business statistics by specific categories.

The navigation system 100 describes the module functions or order as an example. The modules can be partitioned differently. For example, the itinerary module 602, the create route module 603, the navigation module 604, and the edit module 608 can be implemented as one module or with lesser number of modules. Each of the modules can operate individually and independently of the other modules.

Figure 7:
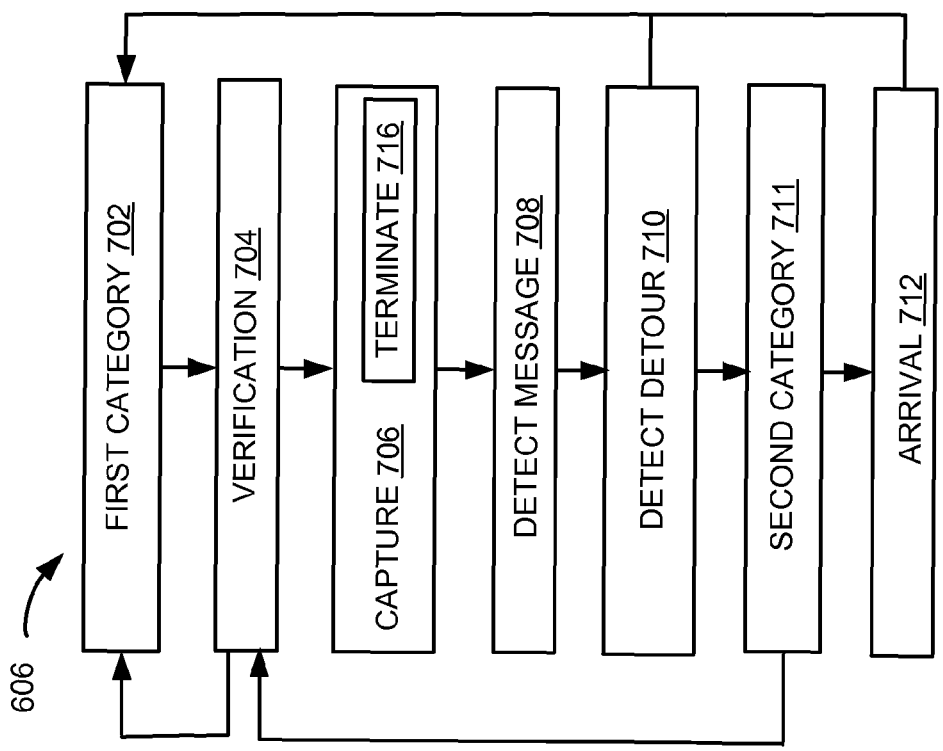
FIG. 7 is a detailed view of the monitor module.

Referring now to FIG. 7, therein is shown a detailed view of the monitor module 606. The monitor module 606 can capture the mileage measurement 214 of FIG. 2 and the temporal measurement 216 of FIG. 2. The monitor module 606 can also detect the detour 302 of FIG. 3 and assign the first travel category 218 of FIG. 2, the second travel category 220 of FIG. 2, or a combination thereof.

The monitor module 606 can include a first category module 702, a verification module 704, a capture module 706, a detect message module 708, a detect detour module 710, a second category module 711, and an arrival module 712. The modules within the monitor module 606, as an example, can be indicated by a number and successively higher module numbers follow one another. Control flow can pass from one module to the next higher numbered module unless explicitly otherwise indicated.

The first category module 702 extracts possible travel categories for destinations based on information associated with the destination and assigns the travel category based on the information extracted. For example, the first category module 702 can access information associated with the destination to assign the travel category out of the extracted possibilities. The information associated with the destination can be included in the itinerary 204 of FIG. 2 or can be extracted from the internet, if the information is not included in the itinerary 204.

For example, the first category module 702 assigns the first travel category 218 by extracting possible travel categories based on the information associated with the destination and information in the itinerary 204 of FIG. 2. The destination labeled "office" in the itinerary 204 can be identified from the itinerary 204. Using the information from the itinerary 204, the navigation system 100 can extract many examples of travel categories for "office" including "work" and travel categories assigned with specific business offices such as "Mr. Jones' Office".

The navigation system 100 can extract more information that is associated with the destination to narrow down the possible travel categories to assign the appropriate travel category for the destination. For example, the navigation system 100 can identify the street address 404 of the destination to narrow down the possible travel categories for the "office". The first category module 702 can perform an internet search of the street address 404 and extract information from the search to assign the travel category.

For example, the first category module 702 can extract "Office Supply Store" from the street address 404. The first category module 702 can use the internet search information to eliminate the travel categories that were extracted from the itinerary 204 example above. The entry of "Office" in the itinerary 204 example did not refer to a business office but instead, referred to the "office Supply Store". The first category module 702 can accurately assign "Work-supplies" as the travel category for the destination labeled "office" in the itinerary 204.

Further for example, the first destination 210 can be a market and the first location name 205 of FIG. 2 can be "ABC Supermarket" that is listed in the itinerary 204. The first category module 702 can detect the words "supermarket" that are associated with the first location name 205. The first category module 702 can extract and assign "personal/grocery" as the first travel category 218 because the first category module 702 detected that the first destination 210 is a market.

If the navigation system 100 does not detect any additional information that contradicts "personal/grocery" as the first travel category 218, the first category module 702 can assign "personal/grocery" as the first travel category 218 for the destination. The navigation system 100 can also have information associated with "ABC Supermarket" that is stored on device memory or access the information from a remote database. The first category module 702 can access the device memory or the remote database instead of performing an internet search to extract additional information.

The navigation system 100 can receive user generated content to increase the accuracy of which travel category is assigned by the first category module 702. For example, a user can input into the navigation system 100 that "ABC Supermarket" is a job location. The first category module 702 can assign "work" as the first travel category 218 instead of "personal/grocery".

The first category module 702 can also assign the first travel category 218 of FIG. 2 or the second travel category 220 of FIG. 2 without the use of the itinerary 204. The details of the operation of the first category module 702 without the use of the itinerary 204 will be described later below.

The verification module 704 displays the selection 303 of FIG. 3 of the first travel category 218 and verifies if the first category module 702 selected the correct travel category for the destination. For example, the verification module 704 can receive the acceptance 304 of FIG. 3 or the rejection 306 of FIG. 3 to verify the first travel category 218. The verification module 704 can display the selection 303 of the first travel category 218 by using the display interface 202 of FIG. 3. The verification module 704 can receive the acceptance 304 or the rejection 306 through user input or an omission of an action.

If the verification module 704 receives the acceptance 304 for the selection 303, the navigation system 100 can begin tracking mileage, time, or a combination thereof under the travel category that was assigned as the selection 303. If the verification module 704 receives the rejection 306 for the selection 303, the verification module 704 can request that another travel category be assigned for the destination.

For example, the first category module 702 can extract and assign "personal/dinning" for the second travel category 220 for the third destination 213 of FIG. 2. For illustrative purposes, the third destination 213 can be a restaurant. The first category module 702 can also extract and assign "Work/Client: Mr. Jones" for the first travel category 218. When the navigation system 100 begins navigating to the third destination 213, the first category module 702 can assign the second travel category 220 as the selection 303 for the third destination 213. The verification module 704 can display the selection 303 and prompt the driver for a response.

If the driver sends the rejection 306 to the verification module 704, the verification module 704 can send a request for the assignment of new travel category as the selection 303. For example, the trip to the restaurant at the third destination 213 can be a business dinner with Mr. Jones that can be tracked under the first travel category 218. If the verification module 704 receives the rejection 306, the verification module 704 can send a request to the first category module 702 to assign another travel category for the destination.

The capture module 706 can start the capture 217 of FIG. 2 of the mileage measurement 214 of FIG. 2 and the temporal measurement 216 of FIG. 2. The capture module 706 can organize the capture 217 of the mileage measurement 214 and the temporal measurement 216 under the assigned travel category.

For example, the mileage measurement 214 can be a measurement for mileage and the temporal measurement 216 can be a measurement for time. If a vehicle is traveling to office of a business client, the capture module 706 can begin tracking the mileage and time it takes to travel to the destination. If the first category module 702 assigned the first travel category 218 for the first destination 210, the capture module 706 can track the mileage measurement 214 and the temporal measurement 216 under the first travel category 218. The capture module 706 can include a terminate module 716.

The terminate module 716 terminates or pauses the capture 217 of the mileage measurement 214 and the temporal measurement 216. The terminate module 716 can pause and resume the capture 217 of the mileage measurement 214 to the first destination 210 if the driver detours from the destination. The terminate module 716 can terminate the capture 217 if the driver has concluded the mileage measurement 214 and the temporal measurement 216 for the destination. The terminate module 716 can also terminate the capture 217 after the arrival 402 of FIG. 4, and after receiving the rejection 306 of FIG. 3 of the continuation query 406 of FIG. 4.

The detect message module 708 receive the message 408 of FIG. 4, the cancellation 410 of FIG. 4, the caller identification 412 of FIG. 4, or a combination thereof. The detect message module 708 can receive new destinations from the message 408. For example, the message 408 can be an e-mail with an appointment with the street address 404 to the new destination not on the travel route 203. The navigation system 100 can generate instructions to the street address 404 that was contained in the e-mail.

The detect message module 708 can also receive the cancellation 410 and the caller identification 412. The caller identification 412 can be sent to the second category module 711 of FIG. 7 for assigning the first travel category 218 or the second travel category 220. The detect message module 708 can send a request to the verification module 704 to verify the cancellation 410. The user can send the acceptance 304 or the rejection 306 to verify the cancellation 410. If the acceptance 304 is received, the terminate module 716 can terminate the capture 217 of the mileage measurement 214 and the temporal measurement 216 for the destination being cancelled.

The detect detour module 710 detects changes to the travel route 203 that are caused by the detour 302 of FIG. 3. The detect detour module 710 also generates routing instructions to the detour 302. The detect detour module 710 can update the travel route 203 after the vehicle has traveled to the detour 302.

The detect detour module 710 can also detect changes to the travel route 203 that are caused by the message 408 and the cancellation 410. For example, the message 408 can include a new destination. The detect detour module 710 can send a request to modify the travel route 203. The detect detour module 710 can detect that the change to the travel route 203 was caused by the message 408.

The detect detour module 710 can send a request to the first category module 702 to extract and assign the first travel category 218 for the detour 302 to a destination not on the travel route 203. The detect detour module 710 can also send a request to the capture module 706 of FIG. 7 to begin the capture 217 for the new destination.

For example, the detect detour module 710 can detect a new destination for the travel route 203. The detect detour module 710 can send a request to the first category module 702. The first category module 702 can extract and assign the first travel category 218 for the new destination. The capture module 706 can begin the capture 217 of the mileage measurement 214 of FIG. 2 and the temporal measurement 216 of FIG. 2 for the new destination.

The second category module 711 extracts possible travel categories for destinations based on information associated with the destination and assigns the travel category based on the information. The second category module 711 receives the detour 302 to a destination not on the original version of the travel route 203 and assigns a travel category for the new destination.

For example, the second category module 711 can assign the first travel category 218 or the second travel category 220 to the detour 302 to the second destination 212 of FIG. 2. The second category module 711 can operate in a similar way to the first category module 702 to assign the travel category. The second category module 711 can send a request to the verification module 704 to confirm the selection 303 of the travel category for the detour 302 to the new destination separate from the travel route 203.

The arrival module 712 detects when the navigation system 100 has arrived at a destination. The arrival module 712 also controls additional functions of the navigation system 100 when the arrival 402 has occurred at the destination. The arrival module 712 can send a request to the first category module 702 to extract and assign a travel category for new destinations. The arrival module 712 will be explained in further detail below.

The physical transformation from assigning the selection 303 of the first travel category 218 results in movement in the physical world, such as people using the first device 102 of FIG. 3, the vehicle, or a combination thereof, based on the operation of the navigation system 100. As the movement in the physical world occurs, the movement itself creates additional information that is converted back to the selection 303 for the continued operation of the navigation system 100 and to continue the movement in the physical world.

The modules of the monitor module 606 can be implemented on the first device 102 of FIG. 5, on the second device 106 of FIG. 6, or partitioned between the first device 102 and the second device 106. The first software 526 of FIG. 5 of the first device 102 of FIG. 5 can include the navigation system 100. For example, the first software 526 can include the first category module 702, the verification module 704, the capture module 706, the detect message module 708, the detect detour module 710, the second category module 711, and the arrival module 712. The first control unit 512 of FIG. 5 can execute the first software 526.

The first control unit 512 can execute the first category module 702, the verification module 704, the capture module 706, the detect message module 708, the detect detour module 710, the second category module 711, and the arrival module 712. The first control unit 512 can execute the first category module 702 and the second category module 711 to assign the first travel category 218. The first control unit 512 can execute the verification module 704 to assign the selection 303 and prompt for the acceptance 304 or the rejection 306.

The first control unit 512 can execute the capture module 706 to begin the capture 217 of the mileage measurement 214 and the temporal measurement 216. The first control unit 512 can execute the detect message module 708 to detect the message 408 of FIG. 4, the cancellation 410 of FIG. 4, and the caller identification 412 of FIG. 4. The first control unit 512 can execute the detect detour module 710 to detect the detour 302 to the travel route 203.

The first user interface 518 of FIG. 5 can be coupled to the verification module 704 to receive the acceptance 304 and the rejection 306. The first communication unit 516 of FIG. 5 can be coupled to the itinerary module 602, the create route module 603, the navigation module 604, and the edit module 608 to send information between the first device 102 of FIG. 1 and the second device 106 of FIG. 1.

In an example for the second device 106 of FIG. 5, the second software 542 of FIG. 5 can include the monitor module 606. For example, the second software 542 can include the first category module 702, the verification module 704, the capture module 706, the detect message module 708, the detect detour module 710, the second category module 711, and the arrival module 712. The second control unit 534 of FIG. 5 can execute the second software 542.

The second control unit 534 can execute the first category module 702, the verification module 704, the capture module 706, the detect message module 708, the detect detour module 710, the second category module 711 and the arrival module 712. The second control unit 534 can execute the first category module 702 and the second category module 711 to assign the first travel category 218. The second control unit 534 can execute the verification module 704 to assign the selection 303 and prompt for the acceptance 304 or the rejection 306.

The second control unit 534 can execute the capture module 706 to begin the capture 217 of the mileage measurement 214 and the temporal measurement 216. The second control unit 534 can execute the detect message module 708 to detect the message 408 of FIG. 4, the cancellation 410 of FIG. 4, and the caller identification 412 of FIG. 4. The second control unit 534 can execute the detect detour module 710 to detect the detour 302 to the travel route 203.

The second user interface 538 of FIG. 5 can be coupled to the verification module 704 to receive the acceptance 304 and the rejection 306. The second communication unit 536 of FIG. 5 can be coupled to the itinerary module 602, the create route module 603, the navigation module 604, and the edit module 608 to send information between the first device 102 of FIG. 1 and the second device 105 of FIG. 1.

In another example, the monitor module 606 can be partitioned between the first software 526 and the second software 542. For example, the first software 526 can include the verification module 704. The second software 542 can include the first category module 702, the capture module 706, the detect message module 708, the detect detour module 710, the second category module 711, and the arrival module 712. The second control unit 534 can execute modules partitioned on the second software 542 and the first control unit 512 can execute modules partitioned on the first software 526.

The first control unit 512 can execute the verification module 704 to assign the selection 303 and prompt for the acceptance 304 or the rejection 306. The first user interface 518 can be coupled to the verification module 704 to receive the acceptance 304 and the rejection 306.

The second control unit 534 can execute the first category module 702 and the second category module 711 to extract and assign the first travel category 218. The second control unit 534 can execute the verification module 704 to assign the selection 303 and prompt for the acceptance 304 or the rejection 306.

The second control unit 534 can execute the capture module 706 to begin the capture 217 of the mileage measurement 214 and the temporal measurement 216. The second control unit 534 can execute the detect message module 708 to detect the message 408, the cancellation 410, and the caller identification 412. The second control unit 534 can execute the detect detour module 710 to detect the detour 302 to the travel route 203.

The second communication unit 536 can be coupled to the itinerary module 602, the create route module 603, the navigation module 604, and the edit module 608 to send information between the first device 102 of FIG. 1 and the second device 105 of FIG. 1.

It has been discovered that the present invention provides a navigation system 100 for providing convenient tools for increasing the safe operation of a vehicle while capturing travel and business statistics. The navigation system 100 can receive the message 408 that includes the detour 302, the cancellation 410, the caller identification 412, or a combination thereof. The navigation system 100 can assign the first travel category 218 to the detour 302 to a new destination based on information extracted from the message 408.

The navigation system 100 can also generate routing instructions to the detour 302 that was received from the message 408. The operation of the navigation system 100 of assigning the first travel category 218 and capturing mileage and time to the first destination 210 and the second destination 212 reduces distractions to the driver of the vehicle. The driver of the vehicle can focus on the safe operation of the vehicle instead of having to input information into the navigation system 100.

Figure 8:
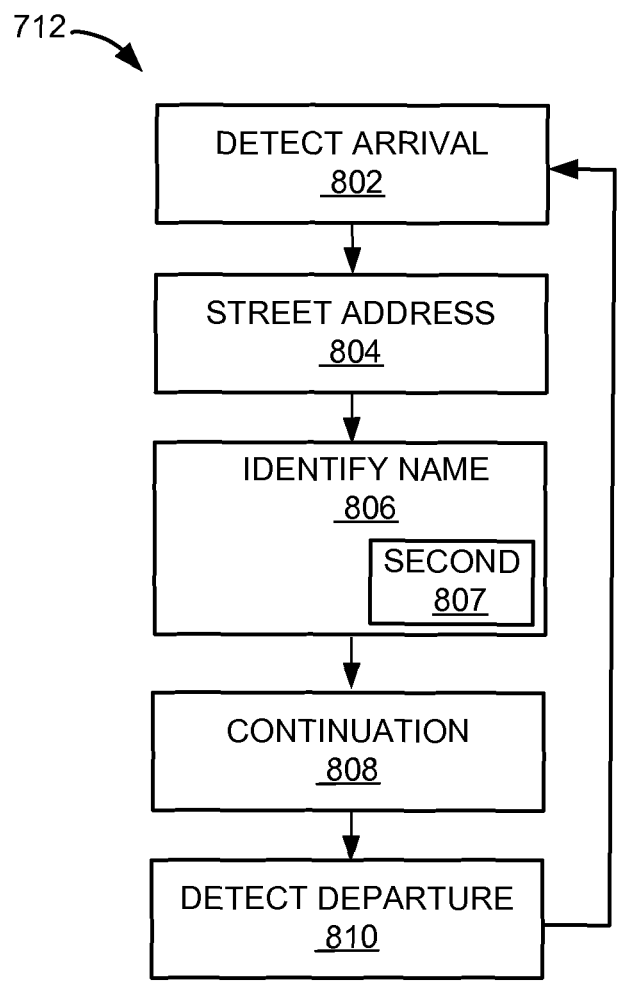
FIG. 8 is a detailed view of the arrival module.

Referring now to FIG. 8, therein is shown a detailed view of the arrival module 712. The arrival module 712 can detect the arrival 402 of FIG. 4. The arrival module 712 can track the mileage measurement 214 of FIG. 2 and the temporal measurement 216 of FIG. 2 without the need for the itinerary 204 of FIG. 2 or a pre-generated route.

For example, the arrival module 712 can allow a driver to track travel and business statistics without having to enter destinations into the navigation system 100 to create the itinerary 204. Once at the destination, the arrival module 712 can assign the travel category by identifying the street address 404 of FIG. 4 and the first location name 205 of FIG. 2 of the destination.

For illustrative purposes, a driver can travel to the first destination 210 which can be labeled as "Mr. Smith's Office" in this example. The arrival module 712 can detect the arrival 402, when the driver's vehicle parks at Mr. Smith's office. For example, the arrival 402 can be detected if the first device 102 of FIG. 1 enters a designated geographic boundary around the destination.

The arrival 402 can also be detected if the location of the first device 102 is located at coordinates that are associated with the destination. The arrival module 712 can detect the street address 404 and can identify the first location name 205 from the first destination 210 after detecting the arrival 402.

The arrival module 712 can send the street address 404 and the first location name 205 of FIG. 2 to the first category module 702 of FIG. 7 for assigning the first travel category 218 of FIG. 2. The capture module 706 of FIG. 7 can use the first travel category 218 to organize the capture 217 of FIG. 2 of the mileage measurement 214 of FIG. 2 and the temporal measurement 216 of FIG. 2 under the first travel category 218. After concluding the trip, the navigation system 100 can provide the user with a report that includes the name of the first destination 210, the street address 404 of the first destination, the mileage measurement 214, and the temporal measurement 216.

The arrival module 712 can also request the continuation query 406 of FIG. 4. For example, the arrival module 712 can prompt the user to terminate or pause the capture 217 of the temporal measurement 216. The arrival module 712 can allow the user to track the time spent at the destination.

The arrival module 712 can include a detect arrival module 802, a street address module 804, an identify name module 806, a continuation module 808, and a detect departure module 810. The modules within the arrival module 712, as an example, can be indicated by a number and successively higher module numbers follow one another. Control flow can pass from one module to the next higher numbered module unless explicitly otherwise indicated.

The detect arrival module 802 detects the arrival 402. The detect arrival module 802 can detect the arrival 402 by detecting when the vehicle has turned off its engine or when the vehicle has stopped at the destination for a pre-determined set of time. For example, the navigation system 100 can have sensors attached to the vehicle's engine to detect when the engine is shut off and turned on.

The detect arrival module 802 can also be configured to wait for a pre-determined set of time to detect the arrival at the destination. For example, the detect arrival module 802 can detect 5 minutes or 10 minutes of vehicle non-movement at the destination to detect the arrival 402.

The street address module 804 identifies the street address 404 for the first destination 210. The street address module 804 can use the GPS location or cellular triangulation of the first device 102 of FIG. 1 to detect the street address 404. The street address module 804 can use geocoding and reverse geocoding by accessing the location coordinates and the associated address from local memory or wirelessly from a remote database to find the street address 404.

The identify name module 806 identifies a name associated with the destination that can be used to label destination from the itinerary 204. For example, the identify name module 806 can identify the first location name 205 of FIG. 2 of the first destination 210 of FIG. 2. Locations can be equipped with radio-frequency identification tags that can provide the identify name module 806 with the name of the location. The identify name module 806 can also identify location names by access a database or perform an internet search for a location name that is associated with the street address 404.

For illustrative purposes, the street address 404 of "1600 Pennsylvania Ave." can be detected by the identify name module 806. The identify name module 806 can search the internet for the location name that is associated with the street address 404. In this example, the identify name module 806 can identify "the White House" as the location name for the first destination 210 of FIG. 2.

The identify name module 806 can also receive user generated content that includes names that are associated with the street address 404. For example, the user can enter the street address 404 and the first location name 205 for the first destination 210. The street address 404 and the first location name 205 can be stored in the navigation system 100 for future use. Information that includes the street address 404 and names associated with the street address 404 can be stored on local memory of the first device 102 of FIG. 1 or stored on the second device 106 of FIG. 2.

The identify name module 806 can send the first location name 205 to the first category module 702 of FIG. 7. The first category module 702 can extract and assign the first travel category 218 based on the first location name 205. The capture module 706 can record the capture 217 of the mileage measurement 214 and the temporal measurement 216 under the first travel category 218. The identify name module 806 can allow the capturing of the mileage measurement 214 and the temporal measurement 216 without the need for the itinerary 204 of FIG. 4 or a pre-generated route.

The identify second name module 807 identifies the second location name 206 associated with a destination that can be used to label destination from the itinerary 204. For example, the identify second name module 807 can identify the second location name 206 of FIG. 2 once the arrival 402 has been detected.

The identify second name module 807 can operate in a similar way as the identify name module 806. For example, the identify second name module 807 can send the second location name 206 to the first category module 702. The first category module 702 can extract and assign the first travel category 218 or the second travel category 220 based on the second location name 206. The capture module 706 can record the capture 217 of the mileage measurement 214 and the temporal measurement 216 under the travel category that is assigned for the second location name 206.

The continuation module 808 displays the continuation query 406 of FIG. 4 and receives the response to the continuation query 406. For example, the continuation module 808 can receive a response to the continuation query 406 by receiving the acceptance 304 of FIG. 3 and the rejection 306 of FIG. 3. If the continuation module 808 receives the rejection 306 of the continuation query 406, the continuation module 808 can send a request to the capture module 706 of FIG. 7 to terminate or pause the capture 217 of the temporal measurement 216.

For example, the continuation module 808 can allow the user to track time spent at the destination. The continuation module 808 can allow the user to terminate the capture 217 of the temporal measurement 216 at the arrival 402 or at any time.

The detect departure module 810 detects when the navigation system 100 is traveling to the next destination. For example, the detect departure module 810 can detect when the driver has returned to the vehicle after concluding the trip to the first destination 210 and has started to travel to the second destination 212. The detect departure module 810 can be coupled to the detect arrival module 802. The detect arrival module 802 can repeat the operation of detecting the arrival 402 when the vehicle arrives at the next destination.

The physical transformation of the travel route 203, the mileage measurement 214, the temporal measurement 216, the first travel category 218, and the second travel category 220 results in movement in the physical world, such as people using the first device 102 of FIG. 5, the second device 106 of FIG. 5, or vehicles, based on the operation of the navigation system 100. As the movement in the physical world occurs, the movement itself creates additional information that is converted back to the travel route 203, the mileage measurement 214, the temporal measurement 216, the first travel category 218, and the second travel category 220 for the continued operation of the navigation system 100 and to continue the movement in the physical world.

The arrival module 712 can be implemented on the first device 102 of FIG. 5, on the second device 106 of FIG. 5, or partitioned between the first device 102 and the second device 106. The first software 526 of FIG. 5 of the first device 102 of FIG. 5 can include the arrival module 712. For example, the first software 526 can include the detect arrival module 802, the street address module 804, the identify name module 806, the continuation module 808, and the detect departure module 810. The first control unit 512 of FIG. 5 can execute the first software 526.

The first control unit 512 can execute the detect arrival module 802, the street address module 804, the identify name module 806, the continuation module 808, and the detect departure module 810. The first control unit 512 can execute the detect arrival module 802 to detect the arrival 402. The first control unit 512 can execute the street address module 804 to identify the street address 404 from the first destination 210.

The first control unit 512 can execute the identify name module 806 to identify the first location name 205 from the first destination 210, the street address 404, or a combination thereof. The first control unit 512 can execute the continuation module 808 to display the continuation query 406 on the first display interface 530 of FIG. 5. The first control unit 512 can execute the detect departure module 810 to assign the selection 303 for the second destination 212.

The first user interface 518 of FIG. 5 can be coupled to the continuation module 808 to receive the acceptance 304 and the rejection 306. The first location unit 520 can be coupled to the detect arrival module 802, the street address module 804, the identify name module 806, the continuation module 808, and the detect departure module 810 to detect the GPS location of the first device 102.

In an example for the second device 106 of FIG. 5, the second software 542 of FIG. 5 can include the arrival module 712. For example, the second software 542 can include the detect arrival module 802, the street address module 804, the identify name module 806, the continuation module 808, and the detect departure module 810. The second control unit 534 of FIG. 5 can execute the second software 542.

The second control unit 534 can execute the detect arrival module 802, the street address module 804, the identify name module 806, the continuation module 808, and the detect departure module 810. The second control unit 534 can execute the detect arrival module 802 to detect the arrival 402. The second control unit 534 can execute the street address module 804 to identify the street address 404.

The second control unit 534 can execute the identify name module 806 to identify the first location name 205 from the first destination 210, the street address 404, or a combination thereof. The second control unit 534 can execute the continuation module 808 to display the continuation query 406 on the first display interface 530 of FIG. 5. The second control unit 534 can execute the detect departure module 810 to assign the selection 303 for the second destination 212.

The second user interface 538 of FIG. 5 can be coupled to the continuation module 808 to receive the acceptance 304 and the rejection 306. The second location unit 552 can be coupled to the detect arrival module 802, the street address module 804, the identify name module 806, the continuation module 808, and the detect departure module 810 to detect the GPS location of the first device 102.

In another example, the monitor module 606 can be partitioned between the first software 526 and the second software 542. For example, the first software 526 can include the continuation module 808. The second software 542 can include the detect arrival module 802, the street address module 804, the identify name module 806, and the detect departure module 810. The second control unit 534 can execute modules partitioned on the second software 542 and the first control unit 512 can execute modules partitioned on the first software 526.

The first control unit 512 can execute the continuation module 808 to display the continuation query 406 on the first display interface 530 of FIG. 5. The first user interface 518 of FIG. 5 can be coupled to the continuation module 808 to receive the acceptance 304 and the rejection 306.

The second control unit 534 can execute the detect arrival module 802, the street address module 804, the identify name module 806, and the detect departure module 810. The second control unit 534 can execute the detect arrival module 802 to detect the arrival 402. The second control unit 534 can execute the street address module 804 to identify the street address 404.

The second control unit 534 can execute the identify name module 806 to identify the first location name 205 from the first destination 210, the street address 404, or a combination thereof. The second control unit 534 can execute the detect departure module 810 to assign the selection 303 for the second destination 212. The second location unit 552 can be coupled to the detect arrival module 802, the street address module 804, the identify name module 806, and the detect departure module 810 to detect the GPS location of the first device 102.

The arrival module 712 describes the module functions or order as an example. The modules can be partitioned differently. For example, the detect arrival module 802, the street address module 804, the identify name module 806, the continuation module 808, and the detect departure module 810 can be implemented as one module or with lesser number of modules. Each of the modules can operate individually and independently of the other modules.

It has been discovered the present invention provides a navigation system with single selection mileage single capture mechanism that can extract and assign the first travel category 218 without the need for the itinerary 204 or a pre-generated travel route. The mechanism can allow a driver to immediately travel to destinations without the need to input information into the navigation system.

For example, the navigation system 100 can track travel and business statistics while on route and assign the first travel category 218 for the first destination 210 after the arrival 402. The navigation system 100 can use the street address 404 to identify the first location name 205 and the purpose of the trip to the first destination 210. The first travel category 218 can be used to organize mileage and hours spent on work, business clients, vacations times and other personal statistics. Automatically assigning the first travel category 218 for the first destination 210 minimizes the information that needs to be inputted into the navigation system 100 adding speed and efficiency to mileage and time bookkeeping.

It has also been discovered that the present invention provides a navigation system 100 with destination travel category extraction measurement capture mechanism that can display the selection 303, the cancellation 410 of FIG. 4, and the continuation query 406. The navigation system 100 can detect when to start or terminate the capture of a business or travel statistic such as mileage and hours spent. To perform these functions, the navigation system 100 only requires a single response of the acceptance 304 of FIG. 3 or the rejection 306 of FIG. 3 of the selection 303 of FIG. 3. The single response increases driver safety by removing distractions from operating the vehicle. The user can also use a single response to confirm that the navigation system has selected the correct travel category for the destination.

Thus, it has been discovered that the navigation system of the present invention furnishes important and heretofore unknown and unavailable solutions, capabilities, and functional aspects for a navigation system for monitoring people and objects.

Figure 9:
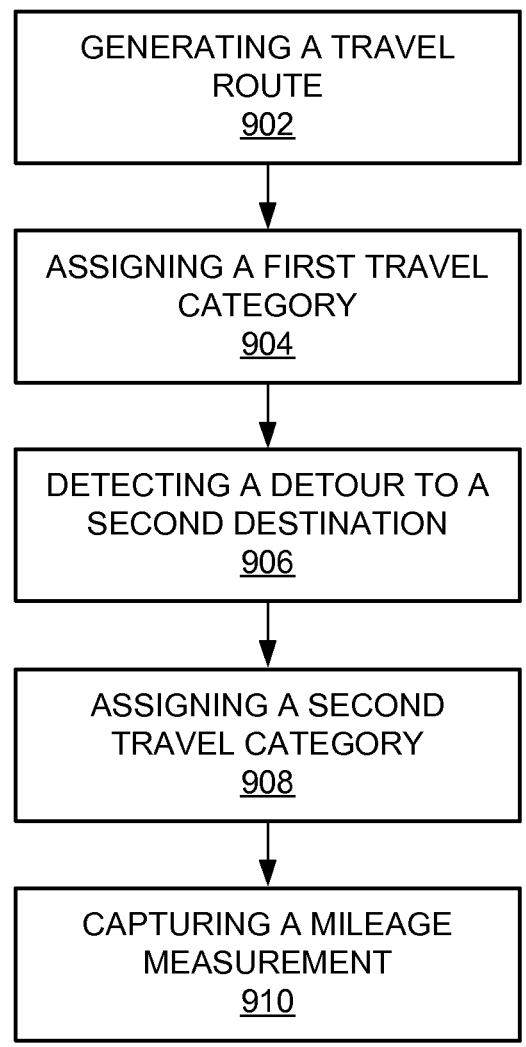
FIG. 9 is a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes: generating a travel route having a first destination in a block 902; assigning a first travel category for the first destination in a block 904; detecting a detour to a second destination separate from the travel route in a block 906; assigning a second travel category for the second destination in a block 908; and capturing a mileage measurement for the travel route where the detour to the second destination is excluded based on the first travel category not being the same as the second travel category for displaying on a device in a block 910.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   generating a travel route having a first destination;
   assigning a first travel category for the first destination;
   capturing a mileage measurement for the first travel category;
   detecting a detour to a second destination separate from the travel route;
   assigning a second travel category for the second destination for representing a purpose or a client determined using a message from another party;
   capturing a mileage measurement for the second travel category; and
   organizing a mileage measurement for the travel route based on:
      excluding the mileage measurement for the detour to the second destination when the first travel category is not the same as the second travel category, and
      using the first travel category and second travel category under a travel category when the first destination is for same purpose as the second destination.

2. The method as claimed in claim 1 further comprising:
   receiving the message having a caller identification;
   capturing the mileage measurement of the detour to the second destination; and
   wherein assigning the second travel category for the second destination includes:
      identifying a street address associated with the caller identification; and
      assigning the second travel category based on the caller identification and the street address.

3. The method as claimed in claim 1 further comprising:
   receiving an itinerary, having a first location name;
   identifying a street address associated with the first location name; and
   wherein:
      generating the travel route includes generating the travel route to the street address; and
      assigning the first travel category includes identifying a purpose associated with the first destination and the first location name.

4. The method as claimed in claim 1 further comprising:
   receiving a street address to the first destination;
   identifying a first location name from the street address; and wherein:
assigning the first travel category includes identifying a purpose associated with the first destination and the first location name.

5. The method as claimed in claim 1 further comprising:
receiving a rejection for the second travel category;
assigning the first travel category for the second destination; and
wherein capturing the mileage measurement for the travel route includes capturing the mileage measurement to the first destination and capturing the mileage measurement to the second destination.

6. A method of operation of a navigation system comprising:
generating a travel route having a first destination;
identifying a first location name associated with the first destination;
assigning a first travel category for the first destination based on the first location name;
capturing a mileage measurement for the first travel category;
detecting a detour to a second destination separate from the travel route;
identifying a second location name associated with the second destination;
assigning a second travel category for the second destination based on the second location name, the second destination for representing a purpose or a client determined using a message from another party;
capturing a mileage measurement for the second travel category; and
organizing a mileage measurement for the travel route based on:
excluding the mileage measurement of the detour to the second destination when the first travel category is not the same as the second travel category, and
using the first travel category and second travel category under a travel category when the first destination is for same purpose as the second destination.

7. The method as claimed in claim 6 further comprising:
receiving a rejection of both the second travel category and the first travel category;
assigning a third travel category for the second destination; and
capturing a mileage measurement for the travel route starting from the first destination to the second destination.

8. The method as claimed in claim 6 further comprising:
receiving a rejection of the second travel category;
assigning the first travel category for the detour; and
wherein capturing the mileage measurement for the travel route includes capturing the mileage measurement to the first destination and to the detour of the second destination.

9. The method as claimed in claim 6 further comprising:
receiving a cancellation; and
terminating the capture of the mileage measurement after the cancellation.

10. The method as claimed in claim 6 further comprising:
detecting an arrival at the first destination;
terminating the capture of the mileage measurement based on the arrival;
displaying a continuation query; and
receiving an acceptance of the continuation of the temporal measurement after the arrival.

11. A navigation system comprising:
a control unit including one or more processors configured to:
generate a travel route having a first destination;
assign a first travel category for the first destination;
detect a detour to a second destination separate from the travel route;
assign a second travel category for the second destination for representing a purpose or a client determined using a message from another party;
capture a mileage measurement for the first travel category, a mileage measurement for the second travel category;
organize the mileage measurement for the travel route based on:
excluding the mileage measurement for the detour to the second destination when the first travel category is not the same as the second travel category, and
using the first travel category and second travel category under a travel category when the first destination is for same purpose as the second destination; and
a storage unit including memory, coupled to the control unit, configured to store the mileage measurement according to the first travel category, the second travel category, or a combination thereof.

12. The system as claimed in claim 11 wherein the control unit is configured to:
receive the message having a caller identification;
identify a street address associated with the caller identification; and
assign the second travel category based on the caller identification and the street address; and
capture the mileage measurement of the detour to the second destination.

13. The system as claimed in claim 11 wherein the control unit is configured to:
receive an itinerary having a first location name;
identify a street address associated with the first location name; and
generate the travel route to the street address; and
assign the first travel category for the first destination based on the first location name.

14. The system as claimed in claim 11 wherein the control unit is configured to:
receive a street address to the first destination;
identify a first location name from the street address; and
assign the first travel category including identifying a purpose associated with the first destination and the first location name.

15. The system as claimed in claim 11 wherein the control unit is configured to:
receive a rejection for the second travel category; and
assign the first travel category for the second destination; and
capture the mileage measurement to the first destination and the mileage measurement to the second destination.

16. The system as claimed in claim 11 wherein the control unit is configured to:
identify a second location name associated with the second destination; and
identify a purpose associated with the first destination and the first location name; and
identify the purpose associated with the second destination and the second location name.

17. The method of claim 16 wherein the control unit is configured to:
    receive a rejection of both the second travel category and the first travel category; and
    assign a third travel category for the second destination; and
    capture the mileage measurement for the travel route starting from the first destination to the second destination.

18. The method of claim 16 wherein the control unit is configured to:
    receive a rejection of the selection of the second travel category; and
    assign the second travel category for the detour to the second destination;
    assign the first travel category for the detour to the second destination; and
    capture the mileage measurement for the travel route includes the mileage measurement to the first destination and to the detour of the second destination.

19. The method of claim 16 wherein the control unit is configured to:
    receive a cancellation; and
    terminate the capture of the mileage measurement after the cancellation.

20. The method of claim 16 wherein the control unit is configured to:
    detect an arrival at the first destination;
    display a continuation query;
    receive an acceptance of the continuation query of the temporal measurement after the arrival; and
    capture a temporal measurement to the first destination and includes a terminate module, coupled to the first category module, for terminating the capture of the mileage measurement based on the arrival.

* * * * *